United States Patent
Mirahsan et al.

(10) Patent No.: US 10,212,097 B2
(45) Date of Patent: Feb. 19, 2019

(54) METHOD AND APPARATUS FOR ADMISSION CONTROL OF VIRTUAL NETWORKS IN A BACKHAUL-LIMITED COMMUNICATION NETWORK

(71) Applicants: Meisam Mirahsan, Gatineau (CA); Nimal Gamini Senarath, Ottawa (CA); Ngoc Dung Dao, Ottawa (CA); Hamidreza Farmanbar, Ottawa (CA)

(72) Inventors: Meisam Mirahsan, Gatineau (CA); Nimal Gamini Senarath, Ottawa (CA); Ngoc Dung Dao, Ottawa (CA); Hamidreza Farmanbar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/181,913

(22) Filed: Jun. 14, 2016

(65) Prior Publication Data
US 2017/0104688 A1    Apr. 13, 2017

Related U.S. Application Data

(60) Provisional application No. 62/239,544, filed on Oct. 9, 2015.

(51) Int. Cl.
*H04Q 7/00*        (2006.01)
*H04L 12/911*      (2013.01)
(Continued)

(52) U.S. Cl.
CPC .......... *H04L 47/70* (2013.01); *H04L 12/4641* (2013.01); *H04L 41/0896* (2013.01);
(Continued)

(58) Field of Classification Search
CPC ... H04L 47/70; H04L 41/5051; H04L 43/062; H04L 41/0896; H04L 12/4641;
(Continued)

(56) References Cited

U.S. PATENT DOCUMENTS 7,925,756 B1    4/2011  Riddle
9,392,471 B1    7/2016  Thomas et al.
(Continued)

FOREIGN PATENT DOCUMENTS

CN    103747020 A    4/2014
EP    1729532 A1     12/2006
(Continued)

OTHER PUBLICATIONS

Błaszczyszyn B. and Yogeshwaran D., "On comparison of clustering properties of point processes," Advances in Applied Probability, vol. 46, No. 1, pp. 1-20, 2014.
(Continued)

*Primary Examiner* — Chuong T Ho

(57) ABSTRACT

Methods and apparatus for determining whether to admit a virtual network using a set of communication network resources are provided. Different network resources can be owned by different infrastructure providers. Virtual network requests include a spatial profile of traffic requirements to be accommodated, and a determination is made as to whether the request can be accommodated based on available network resources. The resources include available backhaul link capacities. The resources can include computing resources for supporting service functions of the virtual network. Monitored network resource usage and traffic corresponding to the virtual network can be used to adjust future requests and accommodations. When a virtual network cannot be accommodated, a counter-offer can be made. Accommodation may incorporate monetary considerations.
(Continued)

A feasibility computation of the admission procedure is formulated.

29 Claims, 8 Drawing Sheets

(51) Int. Cl.
    *H04L 12/46*     (2006.01)
    *H04L 12/24*     (2006.01)
    *H04L 12/26*     (2006.01)
    *H04W 28/02*     (2009.01)

(52) U.S. Cl.
    CPC ........ *H04L 41/5051* (2013.01); *H04L 43/062* (2013.01); *H04L 47/822* (2013.01); *H04W 28/0268* (2013.01); *H04W 28/0289* (2013.01); H04L 41/5077 (2013.01)

(58) Field of Classification Search
    CPC ............. H04L 47/822; H04L 41/5077; H04W 28/0289; H04W 28/0268
    USPC ......................................... 370/328, 329, 330
    See application file for complete search history.

(56) References Cited

U.S. PATENT DOCUMENTS

| | | | |
|---|---|---|---|
| 2003/0103510 A1 | 6/2003 | Svanberg et al. | |
| 2004/0146036 A1 | 7/2004 | Parantainen et al. | |
| 2004/0203973 A1 | 10/2004 | Khan | |
| 2007/0297367 A1 | 12/2007 | Wang et al. | |
| 2008/0130519 A1 | 6/2008 | Bahl et al. | |
| 2009/0154413 A1* | 6/2009 | Kim ....................... | H04W 28/16 370/329 |
| 2009/0191888 A1 | 7/2009 | Abedi et al. | |
| 2010/0069081 A1 | 3/2010 | Mitra et al. | |
| 2010/0122141 A1 | 5/2010 | Arye | |
| 2010/0216404 A1 | 8/2010 | Hershey et al. | |
| 2011/0125905 A1 | 5/2011 | Baucke et al. | |
| 2012/0233302 A1 | 9/2012 | Kallin et al. | |
| 2013/0007232 A1 | 1/2013 | Wang et al. | |
| 2013/0143574 A1* | 6/2013 | Teyeb ............... | H04W 36/0011 455/438 |
| 2013/0182601 A1* | 7/2013 | Bandyopadhyay ... | H04L 45/245 370/252 |
| 2013/0183991 A1 | 7/2013 | Bosch et al. | |
| 2013/0201847 A1 | 8/2013 | Chincholi et al. | |
| 2013/0212285 A1* | 8/2013 | Hoffmann ........... | H04L 12/4641 709/226 |
| 2013/0225123 A1 | 8/2013 | Adjakple et al. | |
| 2014/0086177 A1 | 3/2014 | Adjakple et al. | |
| 2014/0086194 A1 | 3/2014 | Sugahara et al. | |
| 2014/0219104 A1* | 8/2014 | Senarath ............. | H04L 41/0896 370/238 |
| 2014/0269295 A1 | 9/2014 | Anumala | |
| 2014/0282769 A1 | 9/2014 | Salem et al. | |
| 2014/0301192 A1* | 10/2014 | Lee ........................ | H04L 47/10 370/230 |
| 2014/0317261 A1 | 10/2014 | Shatzkamer | |
| 2015/0063112 A1 | 3/2015 | Wu et al. | |
| 2015/0104172 A1 | 4/2015 | Wang et al. | |
| 2015/0154258 A1 | 6/2015 | Xiong et al. | |
| 2016/0044702 A1 | 2/2016 | Centonza et al. | |
| 2016/0105893 A1 | 4/2016 | Senarath et al. | |
| 2016/0119189 A1* | 4/2016 | Choi ....................... | H04L 41/12 709/223 |
| 2016/0352528 A1 | 12/2016 | Law et al. | |
| 2016/0353281 A1 | 12/2016 | Senarath et al. | |
| 2017/0079059 A1 | 3/2017 | Li et al. | |
| 2017/0104609 A1 | 4/2017 | McNamee et al. | |
| 2017/0126492 A1 | 5/2017 | Law et al. | |
| 2017/0127427 A1 | 5/2017 | Claridge et al. | |
| 2017/0141973 A1 | 5/2017 | Vrzic | |
| 2017/0208019 A1 | 7/2017 | Shimojou et al. | |
| 2017/0257870 A1 | 9/2017 | Farmanbar | |

FOREIGN PATENT DOCUMENTS

| | | | |
|---|---|---|---|
| EP | 2493235 | A1 | 8/2012 |
| EP | 2627140 | A1 | 8/2013 |
| EP | 2667541 | A1 | 11/2013 |
| EP | 2866495 | A2 | 4/2015 |
| GB | 2512900 | A | 10/2014 |
| JP | 2009542091 | A | 11/2009 |
| JP | 2011508474 | A | 3/2011 |
| JP | 2013541289 | A | 11/2013 |
| JP | 2014045390 | A | 3/2014 |
| JP | 2014090501 | A | 5/2014 |
| JP | 2015080204 | A | 4/2015 |
| KR | 20130084680 | A | 7/2013 |
| WO | 2009071431 | A1 | 6/2009 |
| WO | 2011032595 | A1 | 3/2011 |
| WO | 2013093462 | A1 | 6/2013 |
| WO | 2014086978 | A1 | 6/2014 |
| WO | 2014090997 | A1 | 6/2014 |
| WO | 2014117135 | A2 | 7/2014 |
| WO | 2014160228 | A1 | 10/2014 |
| WO | 2014197778 | A1 | 12/2014 |

OTHER PUBLICATIONS

3GPP TR 22.891 entitled "Study on New Services and Markets Technology Enablers," Release 14, Version 1.2.0.

ETSI GS NFV 001 entitled "Network function virtualization (NFV); Use Cases", Oct. 2013.

ETSI GS NFV 002 entitled "Network function virtualization (NFV); Architectural Framework", Oct. 2013.

Yang, M, Li, Y., Zeng, L., Jin, D. and Su, L. "Karnaugh-map like online embedding algorithm of wireless virtualization," in Wireless Personal Multimedia Communications (WPMC), 2012 15th International Symposium on. IEEE, 2012, pp. 594-598.

Yang, M., Li, Y. , Liu, J., Jin, D., Yuan, J. and Zeng, L. "Opportunistic spectrum sharing for wireless virtualization," in Wireless Communications and Networking Conference (WCNC), 2014 IEEE. IEEE, 2014, pp. 1803-1808.

3GPP TR 22.891 V0.1.0 (Apr. 2015),3rd Generation Partnership Project;Technical Specification Group Services and System Aspects;Feasibility Study on New Services and Markets Technology Enablers;Stage 1 (Release 14), total 26 pages.

European Search Report dated Nov. 22, 2017 for corresponding European Application No. 16802559.1 filed Jun. 1, 2016.

Hamid Farmanbar et al.,"Trathc Engineering for Software-Defined Radio Access Networks", 2014 IEEE Network Operations and Management Symposium, May 5, 2014.

Extended European Search Report dated Feb. 27, 2018 for corresponding European Application No. 16802562.5 filed Jan. 6, 2016.

Extended European Search Report dated Mar. 27, 2018 for corresponding European Application No. 16802556.7 filed Jun. 1, 2016.

Partial Supplementary European Search Report dated Apr. 19, 2018 for corresponding European Application No. 16802558.3 filed Jun. 1, 2016.

Liang et al., "Wireless Virtualization for Next Generation Mobile Cellular Networks", IEEE Wireless Communications, pp. 61-69, Feb. 1, 2015.

Liang et al., "Wireless Network Virtualization: A Survey, Some Research Issues and Challenges", IEEE Communications Surveys & Tutorials, vol. 17(1), Jan. 1, 2015.

Extended European Search Report dated Mar. 1, 2018 for corresponding European Patent Application No. 16802560.9 filed Jun. 1, 2016.

Takuya Shimojyo, et al., Future Mobile Core Network for Efficient Service Operation, Network Softwarization, 2015 1st IEEE Conference on, Apr. 2015.

(56) References Cited

OTHER PUBLICATIONS

Tsuyoshi Ogura et al., "A Study on Congestion Avoidance Technology using Multiple Virtual Networks", IEICE technical report, vol. 114 No. 28, May 8, 2014.

* cited by examiner

METHOD AND APPARATUS FOR ADMISSION CONTROL OF VIRTUAL NETWORKS IN A BACKHAUL-LIMITED COMMUNICATION NETWORK

CROSS-REFERENCE TO RELATED APPLICATIONS

This application claims priority to U.S. Provisional Application Ser. No. 62/239,544 filed Oct. 9, 2015, the contents of which are hereby incorporated by reference.

FIELD OF THE INVENTION

The present invention pertains to the field of communication networks and in particular to a method and apparatus for admitting virtual networks in a host communication network having backhaul limitations.

BACKGROUND

It is no longer necessary for a single entity to own and administer all resources and infrastructure when providing communication network services. Mobile virtual network operators (MVNOs) have emerged who obtain bulk access to network resources owned by others, and package and provide services to their own customers using these resources. Conventionally, MVNOs enter into long-term leases for accessing the network resources.

Furthermore, there is an increasing need for user groups or organizations, such as public safety groups (e.g., fire, police, etc.), or enterprise teams (e.g., taxi dispatch services), to interconnect their users without deploying their own communication network infrastructure. Accordingly, such groups look to others to operate and administer virtual networks on their behalf.

However, addressing the competing requirements of MVNOs and virtual network customers when network resources are limited can be a difficult task. Conventional approaches for determining whether to allow a single device access to a communication network are not adequate for use in admitting entire virtual networks.

Therefore there is a need for a method and apparatus for admission control for virtual networks, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for admission control for virtual networks. In accordance with embodiments of the present invention, there is provided a method for admitting a virtual network using communication network resources controlled by one entity or by a plurality of entities. A request for admitting the virtual network is received by a service provider from a customer entity. The request may include a geographic traffic profile associated with the virtual network. The geographic traffic profile describes the geographic variation in traffic demand statistics expected by devices, such as mobile devices, accessing the virtual network. The service provider determines that accommodating the request is feasible based on information regarding network resources available for use by the virtual network. The determination may involve computation according to a feasibility or optimization problem with various constraints reflecting the requirements of the virtual network relative to the network capabilities available. The network resources include communication capacities available on backhaul links usable by the virtual network. The network resources may include other resources, such as access link resources and computing resources for implementing service functions. Some or all of the network resources may be controlled by the service provider. Some or all of the network resources may be controlled by infrastructure providers, with the service provider acquiring usage privileges to those resources. When accommodating the request is feasible, the virtual network is created, for example by generating and transmitting instructions to one or more network nodes to establish the virtual network.

In accordance with embodiments of the present invention, there is provided an admission controller in a communication network. The admission controller includes a network interface configured to communicate with entities such as potential and existing virtual network customers, infrastructure providers, service providers, and network nodes. The network interface may receive requests for admitting virtual networks and transmit instructions to network nodes to establish virtual networks. The admission controller includes a computing device configured to determine that accommodating virtual network requests are feasible. The admission controller can be a dedicated device in the network, or an aspect of a networked computing device or a collection of devices.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
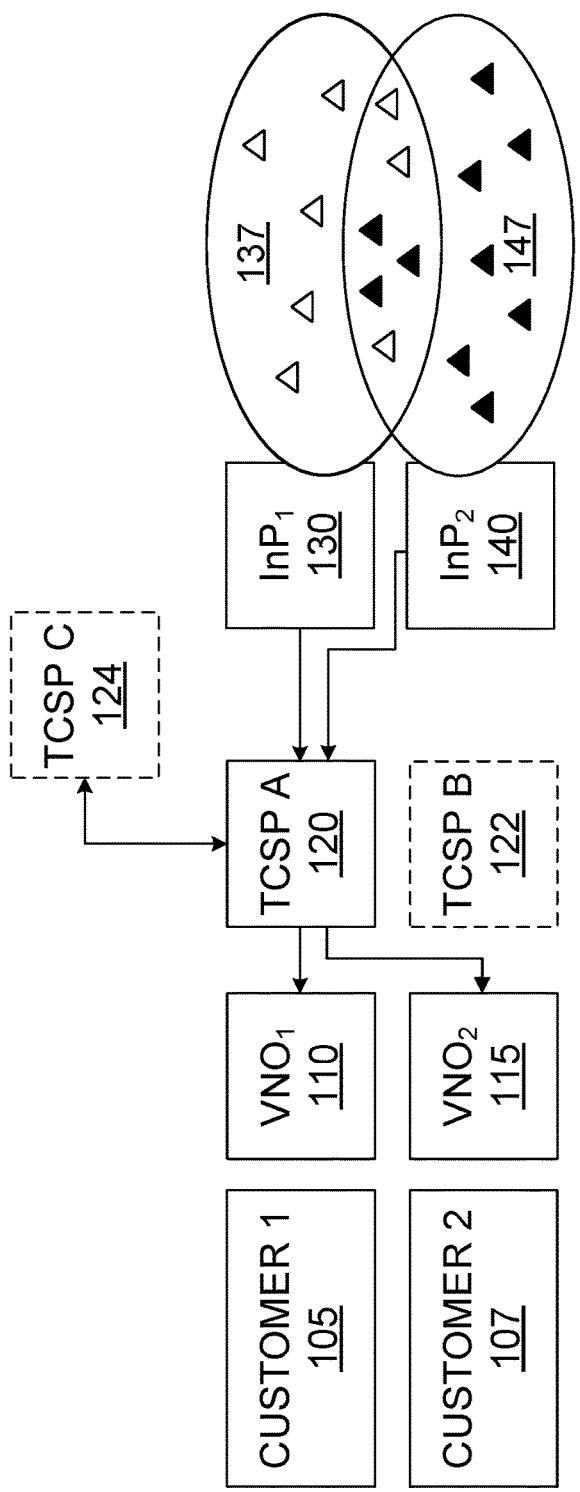
FIG. 1 illustrates a network structure according to an embodiment of the present invention.

As used herein, a "network" or "communication network" may service various devices including but not necessarily limited to mobile devices. Such a network may include a radio access portion and backhaul portion. The network may further comprise various virtualized components. A primary example of such a network is a $5^{th}$ generation mobile network, for example as defined by the Next Generation Mobile Networks Alliance, which is reconfigurable and capable of operating according to network slicing, as described below.

A customer device may refer to one of a variety of devices, such as mobile devices, user equipment (UE) devices, stationary or mobile machine-type devices, or other endpoint devices which may access a virtual network. In various embodiments, a customer device may communicate with an access node via wireless communication. One skilled in the art will appreciate that a mobile device is a device designed to connect to a mobile network. This connection typically makes use of a wireless connection to an access node. An access node (AN) may be a base station, Wi-Fi™ wireless access point, NodeB, evolved NodeB, or other device which provides a point of access to a backhaul network. Although the mobile network is designed to support mobility, it is not necessary that the mobile device itself be mobile. Some mobile devices, such as metering devices (e.g. smart meters) may not be capable of mobility, but still make use of the mobile network.

Embodiments of the invention are applicable in scenarios in which different entities operate different portions of a communication network and/or provide different services. Infrastructure providers (InPs) own or control physical equipment or transmission media such as wireless spectrum, usage of which is provided to others for a consideration such as a monetary fee. Physical equipment may include radio access network resources such as wireless access nodes and radio access transceivers, network infrastructure such as routers and switches, computing resources and gateway, wired, optical or wireless transmission media, backhaul connection resources. Physical equipment may include cloud-based resources for example located in a datacenter. One or more InPs may provide radio access network resources, and the same or other InPs may provide backhaul connection resources. Telecommunication Connectivity Service Providers (TCSPs) acquire rights to use the equipment and resources of infrastructure providers and package and sell services to customers which are supported using these resources. TCSPs may also be InPs in some embodiments, and therefore may control at least some resources. For example, a TCSP may own resources such as network access nodes in one geographic region but may acquire resources from another InP when resources outside of the geographic region are required. In some embodiments, a TCSP provides basic telecommunications connectivity services over a given geographic area, but interacts directly with virtual network operators, rather than end users.

In a typical scenario, access to a communication network may be requested on behalf of groups of users or mobile devices associated with virtual networks (VNs), such as wireless VNs (WVNs). VNs are operated by VN operators (VNOs), such as mobile VNOs (MVNOs), who may use the physical resources owned by one or more other entities to support the VN. VNOs may be customers who wish to have a virtual network or group of virtual networks instantiated for use.

Rather than interacting directly with InPs, VNOs may obtain access to network resources through a TCSP. A VNO may contract for a TCSP to provide VN services. In supporting a number of different VNOs, a TCSP may be required to attempt to meet resource demands using the allocation of resources that it is able to obtain from the InPs. Examples of InPs include cellular network providers, Wi-Fi™ network providers, other wireless network providers, and owners of equipment such as access nodes, computing resources and communication links.

In some embodiments, a VNO uses resources provided by one or more TCSPs. This frees the VNO from needing to manage infrastructure, for example across a large geographic area. Such VNOs may have a priori knowledge of a distribution of its own user traffic, which can be statistically quantified. Quantification of traffic distribution patterns can differ based on differing vertical services offered by the VNO such as taxi service, sensor networks, alarm/security operators, etc. These traffic distribution patterns may be used by the TCSP in the admission control process.

Embodiments of the present invention provide for a method and apparatus for addressing customer requests to establish or admit a virtual network (VN), also referred to as virtual network admission control. Admitting a virtual network may include creating a new virtual network or adjusting an existing virtual network. The request may be received by a TCSP and accommodated using resources controlled by one or more InPs. Usage rights for the resources may be acquired on demand by the TCSP, or the usage rights may have already been acquired. The TCSP performs the admission control procedure to determine if adequate network resources are available or can be acquired for accommodating the request. The TCSP then and accepts, revises or rejects the request accordingly. Revising a request may include transmitting a revised set of operating and/or pricing parameters describing the virtual network, for consideration by the customer as a counter-offer, for example when the original request cannot be feasibly accommodated.

Embodiments of the present invention provide for admission control decisions made based on VN requests which specify an expected geographic traffic profile. Such requests can request a specified Quality of Service (QoS) and/or Quality of Experience (QoE) which may be determined based on key performance indicators (KPIs). Embodiments of the present invention provide for determining whether a TCSP can satisfy a VN request using the available resources without impacting already-embedded VNs. A request may be deemed satisfiable or feasible if the VN can be operated with the specified geographic traffic profile and requirements, while the requirements of other already-admitted VNs can also still be satisfied (potentially after renegotiation). Requirements may be expressed via KPIs. In some embodiments in which additional resources are requested in real time from InPs, part of the decision may be to delay the admission until additional resources can be obtained.

Some embodiments consider heterogeneous geographical traffic distributions. Traffic distributions may be expressed statistically. Some embodiments account for limits on backhaul capacity in the admission control decision. Some embodiments consider delay as a service requirement in the admission control decision. This may be important for customers with time-sensitive service requirements. A VN request may specify different maximum traffic delay parameters for different types of traffic. The maximum delay for traffic parameters can also vary geographically.

Admission control decisions can be made by considering a series of constraints to determine whether sufficient resources are available to satisfy a VN request. In some embodiments the decision is based at least in part on whether other connections (e.g., of other VNs) will be adversely affected. In some embodiments the decision is binary: can the request be satisfied or not. In other embodiments, the decision can indicate increased costs necessary to satisfy a request. For example, the decision may indicate whether additional resources must be obtained from other InPs. In some embodiments, the decision can indicate adjustments to the parameters of the request that would be required in order to grant the request. For example, a TCSP may reply that a requested demand for a given area cannot be met, but a reduced demand can be allowed, if the VNO customer is willing to accept such a modification to the service request.

Aspects of the present invention provide systems and methods for analytical and statistical admission control of wireless virtual networks. Embodiments consider backhaul capacity constraints, heterogeneous geographic traffic profiles, and/or traffic demand tuning. Embodiments may evaluate load limitations on wireless access points so that the traffic passing each AN does not exceed its backhaul capacity. Embodiments consider multiple ways of specifying geographical traffic distribution. Customer geographic traffic profile can be updated by online measurement of real traffic demands and feedback can be provided to VNO customers. Some embodiments allow for on-the-fly admission decisions with statistical guarantee of KPIs. Some embodiments can allow for an increase in InP profit due to higher network utilization. Some embodiments consider network-level, bin-level and/or packet-level KPIs. Packet delay requirements can also be considered.

Embodiments of the present invention provide an admission control method for a VN based on statistical geographic traffic distribution over time and space. The admission control method may provide service guarantees of KPIs and per-user QoE requirements, considering the availability of both access link and wireline/optical link resources.

Statistical admission control procedures often provide for multiplexing gains. For example, VNs may be admitted based on their statistical distribution of demands (in time and space) rather than their peak demands. This type of admission control is based on the judgement that it is unlikely that all VNs will present their peak traffic at the same time and location. An alternative would be to admit VNs only if each of their peak traffic requirements can be met at the same time. This often results in a requirement to overprovision the underlying network, which leads to wasted resources. The multiplexing gain on the resources that a TCSP can obtain is dependent on the knowledge of the clients' KPI choices and traffic distribution and characteristics. In addition to VN admission control, the methods discussed herein can allow for dynamic adjustment of the charging and service requirements utilizing the customer-TCSP interface.

Virtual networks provided by a TCSP may include both node resources and link resources. Node resources include access nodes which mobile devices can communicate with wirelessly to access the virtual network. Node resources may include routers, service function nodes, or other computing and/or communication devices as required by the virtual network. Link resources may include wired, wireless, and/or optical access links and backhaul links, or more commonly portions thereof as allocated using time, frequency, or code based multi-access techniques. In various embodiments, an end-to-end service is provided for the VN, allowing a VN's customers to connect to the network and access the services. In the end-to-end service, resources including access links, backhaul links, and end node resources are accounted for in the admission control procedure.

The resources allocated to a VN may be statically allocated, or dynamically varied along with demand. As will be understood to those skilled in the art, even when a resource allocation to a VN is static, the underlying resources may be varied.

When resources are allocated using a network slicing approach, physical resources may be allocated to a VN using a hard slicing approach or a soft slicing approach. In the hard and soft slicing approaches, the underlying physical resources can be statically committed and dynamically committed, respectively.

In relation to the above, hard slicing refers to the reservation of physical resources for a network slice, where the reserved resources cannot be used by another slice even if they are unutilized or under-utilized. Soft slicing refers to an approach in which specific resources are not reserved, but rather resource allocation upper bounds are specified. In soft slicing, a set of shared network access resources may be scheduled and shared dynamically by multiple slices. Physical resources may correspond to a portion of a shared physical resource, such as a computing device, memory device, network interface, or communication link.

FIG. 1 illustrates a network structure according to an example embodiment of the present invention. A plurality of end user population groups, which in FIG. 1 have each been designated as Customer 1 105 and Customer 2 107, obtain VN services from one or more VNOs 110, 115. Such end user population groups can include, for example, alarm/sensor companies, security services, utilities which monitor utility meters, video distribution companies, public safety services such as police and fire departments, E-health monitoring services, and taxi dispatch services. Each of these customer groups can contract with particular VNOs to obtain VN services for their users/devices.

FIG. 1 further illustrates a TCSP 120 configured for providing service to the VNOs 110, 115. Multiple other TCSPs may be present, for example a competing TCSP 122 and a TCSP 124 which shares resources with the first TCSP 120. In providing service to the VNOs, the TCSP 120 may access and use infrastructure resources that are not necessarily owned or always available to the TCSP. For example, to satisfy the requirements of a VNO, the TCSP may utilize the resources and/or services of one or more InPs 130, 140. These external resources and services may be used for example to establish a VN in geographic areas that are not served by the TCSP, or in which the TCSP lacks sufficient resources. The TCSP may utilize resources from multiple InPs, for example to provide a given VN.

In some embodiments, each InP provides connectivity services in a particular geographic area. For example, a first InP 130 may own a first set of access nodes providing wireless network coverage for a first geographic region 137, while a second InP 140 may own a second set of access nodes covering a second different, possibly overlapping geographic region 147. To provide a virtual network accessible from both the first and second geographic regions, the TCSP may obtain rights to use access nodes of both the first and second InPs. It should be well understood that if two InPs have overlapping coverage areas, the TCSP may still decide to obtain rights to ensure a deeper coverage instead of a broader one.

In operation, the TCSP 120 receives a request for establishing the virtual network from one of the VNOs 110, 115, and also receives information from the InPs 130, 140, and/or internal data sources of the TCSP. The information indicates the network resources available for use by virtual communication networks to be accommodated by the TCSP. The TCSP then performs admission control by determining whether accommodating the current request is feasible, based on the parameters of the request and the indicated available network resources. The determination may be made by computations according to a feasibility or optimization problem.

In various embodiments, multiple types of available network resources can be considered in the admission control decision. For example, admission control may be based on both wireless access resources and backhaul communication resources. When accommodating the request is feasible, the TCSP transmits instructions to one or more network nodes to establish the virtual communication network. In some embodiments, accommodating a request is deemed feasible if a VN can be provided service which satisfies KPIs while service to already admitted VNs is still provided in accordance with their KPIs. In some embodiments, determining whether accommodating the request is feasible is based concurrently on considerations of data rate, packet delay and outage probability. It should be understood by those skilled in the art that if the admission of a VN will adversely affect the ability of a TCSP to meet the KPIs of an already admitted VN, the TCSP may elect to renegotiate the KPIs of the already admitted VN. Alternatively, the TCSP may elect to willfully fail to provide service meeting the KPIs of the already admitted VN if the penalties for doing so are acceptable.

Figure 2:
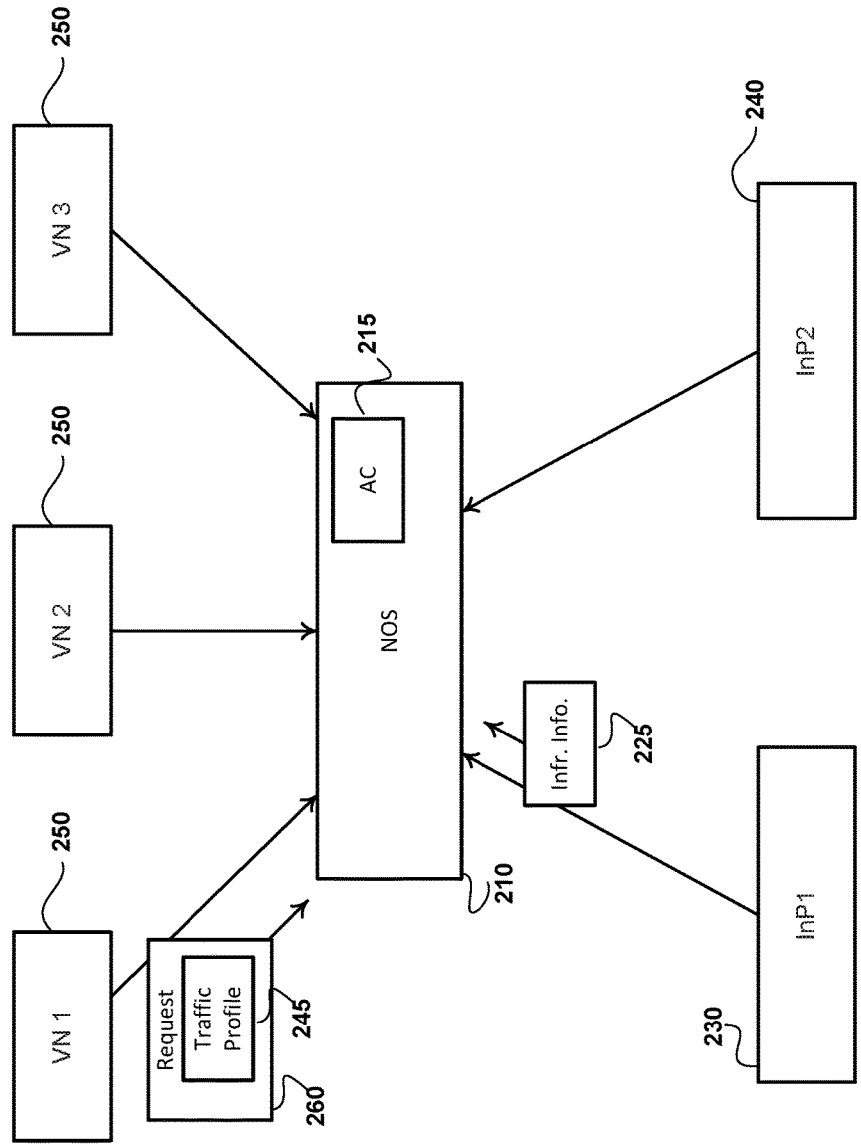
FIG. 2 illustrates a network operating system for performing virtual network admission control, according to an embodiment of the present invention.

FIG. 2 illustrates a network operating system (NOS) 210 for performing VN admission control (VNAC), according to an embodiment of the present invention. Wireless infrastructure resource information 225, for example, physical layer (PHY) information, is provided to a network operating system (NOS), and more specifically to an admission controller (AC) 215 thereof. The NOS may be operated by a TCSP, whereas the wireless infrastructure may be controller by infrastructure providers (InPs) 230, 240, although the TCSP can also operate its own infrastructure. The AC may be a stand-alone device, or it may be a portion of another networked computing device. In some embodiments the AC can be instantiated as a software module executed by one or more processors in the network, for example using network function virtualization.

VN geographic traffic profiles 245 and required KPIs are submitted by VN operators 250, such as MVNOs, to the NOS. The geographic traffic profiles may be submitted as part of a request 260 transmitted to the TCSP to establish a new virtual network or to adjust parameters of an existing virtual network. Geographic traffic profiles represent the locations or expected locations of mobile devices which are expected to access the virtual network.

In some embodiments, the geographic traffic profile includes an expected traffic demand. Expected traffic demand may indicate variation in expected resource demands over a geographic area. Expected traffic demand may also indicate variation in expected resource demands over time. A traffic demand matrix may be used to indicate geographic and/or temporal variation in resource demands. A geographic traffic profile may model the expected location and distribution of users in both space and time as random parameters.

As an example, a VNO may be a taxi dispatch service. The VNO can provide a geographic profile of expected traffic demand based on location of airports, downtown taxi stands and historical statistical data of demand by area in a series of time windows.

The indication of available network resources, for example as provided by the InPs, includes an indication of communication capacities available on backhaul links usable by the virtual communication network. The indication of available network resources may include an indication of computing resources available for supporting computing requirements of one or more service functions of the virtual communication network, which may be indicated in the request. The indication of available network resources may include an indication of wireless access link capacities available at access nodes for use by the virtual communication network. Other available network resources may also be indicated. Available network resources correspond to InP resources which have not yet been allocated for other purposes, and/or available capacities of resources which have been partially allocated for other purposes. Resource availability can be specified in an appropriate unit, such as millions of instructions per second of computing power, or communication bandwidth of a transmission medium or access node.

Figure 3:
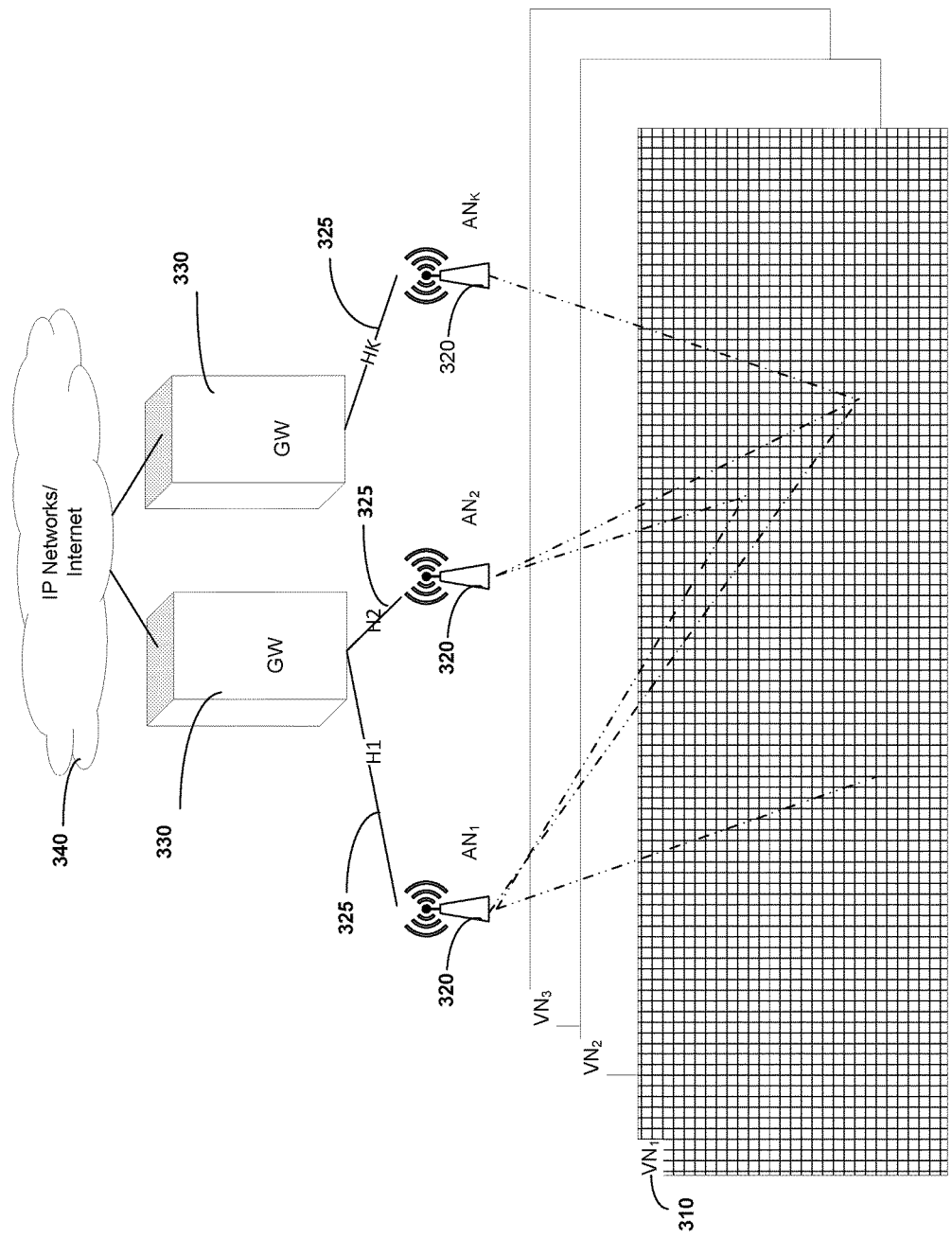
FIG. 3 illustrates a geographic area subdivided into a set of sub-areas referred to as bins, according to an embodiment of the present invention.

In various embodiments, the request for establishing the virtual network includes a geographic traffic profile to be accommodated by the virtual network. The geographic traffic profile may be provided in the form of a statistical profile of traffic demands indicating the variation in expected traffic activity across a given geographic region. FIG. 3 illustrates a network area 310 subdivided into a set of sub-areas referred to as bins. Each region may correspond to a small area, such as a 5 meter by 5 meter area. The illustrated subdivision is shown as a rectangular grid, with each bin corresponding to a square of the grid. However, the bins may be provided in a variety of sizes and shapes, such as hexagonal regions. Different bins may be the same size and/or shape or different sizes and/or shapes. Mobile devices in each bin can be served by a designated access node or plurality of access nodes 320. Mobile devices can be served by an access node with relatively low SINR but relatively high available bandwidth. In the illustrated embodiment, each access node is communicatively coupled via a backhaul network to one or more gateway nodes 330. Gateway nodes are communicatively coupled to other IP networks 340 such as the Internet. Coupling from access nodes to gateways is provided via a backhaul network, including backhaul links 325, with link k having available capacity $H_k$. Backhaul capacities are limited and the available capacities may be taken into consideration when performing virtual network admission control. For example, an admission control decision may involve determining, for each bin of the geographic traffic profile, whether the expected VN traffic for that bin can be adequately accommodated using current backhaul capacities for access nodes serving the bin.

Figure 4:
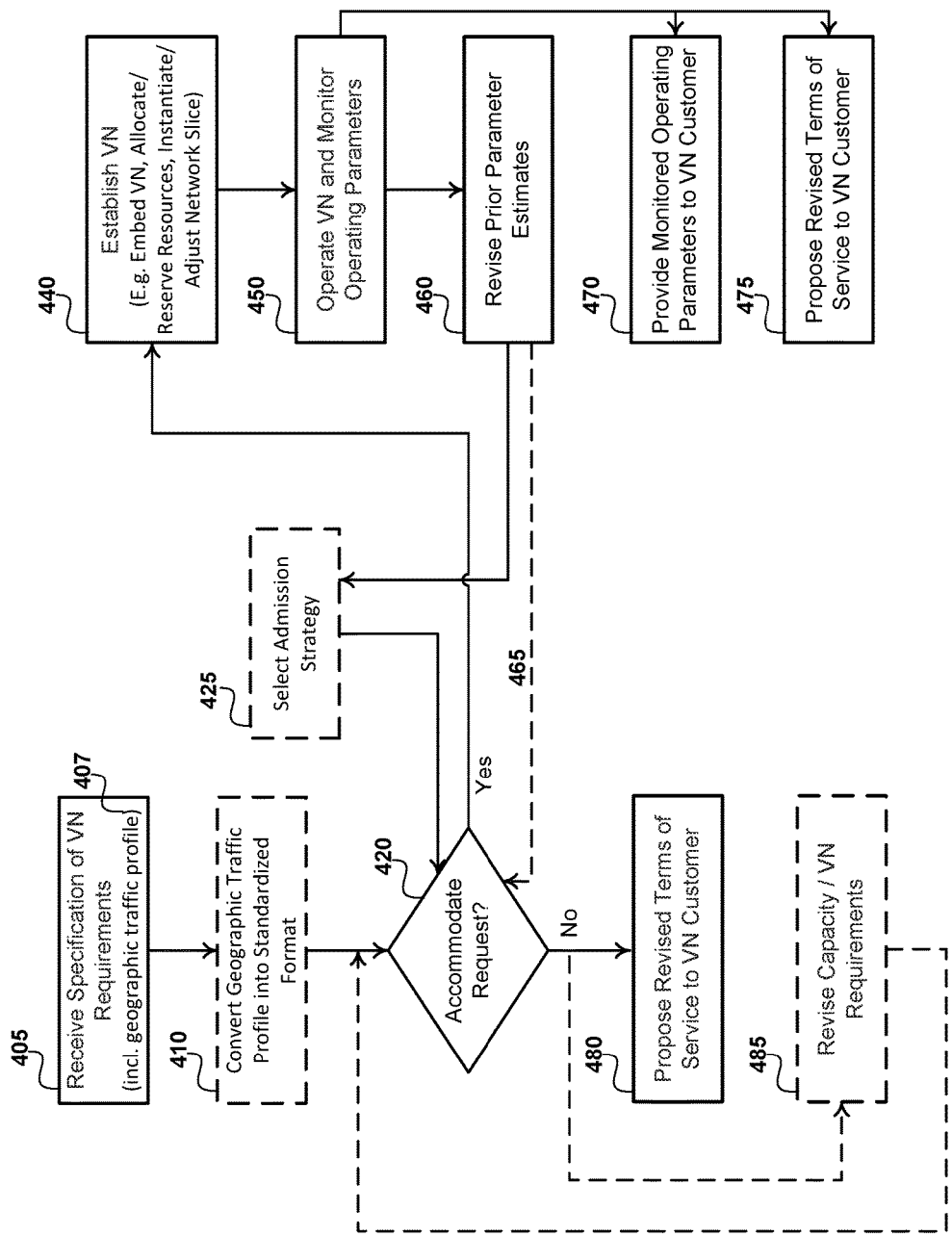
FIG. 4 illustrates an admission control procedure in accordance with embodiments of the present invention.

FIG. 4 illustrates an admission control procedure in accordance with embodiments of the present invention. The procedure includes receiving 405 a specification of virtual network requirements in association with a request for establishing a virtual network for a VN customer. The specification can include KPI requirements such as data rate requirements, acceptable coverage and/or outage requirements specified in space, time, or both, packet-level KPIs such as maximum acceptable packet delay and jitter parameters, monitoring services and parameters regarding acceptable service costs, and quality-of-experience (QoE) indicators. The specification can include a geographic traffic profile 407. The specification can include service function chain requirements, such as computing capability requirements for implementing service functions in the VN. The specification can also include projected traffic parameters such as the mean/average expected amount of traffic, expected traffic variability, and expected peak traffic. Traffic parameters can be specified for each of a number of regions in the coverage area of the service provider. Traffic generation in a given area can be time varying, and the temporal variations in parameters may be specified in the request.

For example, for a downtown location, the expected number of service requests in a proposed VN may be specified as 100 requests per minute per square kilometer between 9 am and 5 pm, 50 requests between 7 am and 9 am and between 5 pm and 7 pm, 20 requests between 7 pm and 11 pm, etc. The expected variance can be up to 35% between 7 am and 9 pm, 75% between 9 am and 11 am, 35% between 11 am and 4 pm, 75% between 4 pm and 7 pm and 15% at other times. In some embodiments, finer granularity can be specified, both in terms of geographic area and time, and statistics as to how such mean/average rates may vary can be provided.

In some embodiments, the procedure includes extracting and providing one or more particular parameters based on the specification. For example, parameters as traffic generation rate, allowable traffic outages, and allowable delays, may be forwarded on to a further step of the procedure. The traffic generation rate may include a geographic variation in accordance with the geographic traffic profile.

The procedure may further include converting 410 the geographic traffic profile of the specification into a standardized geographic profile used by the access control procedure. For example, the customer-provided geographic traffic profile may indicate variation in customer traffic activity on the basis of a set of geographic bins having a first resolution. Or, the customer-provided geographic traffic profile can specify an overall mean rate, a limited number of regions of higher and/or lower activity, or detailed demand information. This information can be converted to indicate variation in customer traffic activity based on a set of geographic bins having a second resolution which is used for admission control. The standardized form may be based on a network topology of the TCSP and its available resources. In some embodiments, the bins are differently sized in different parts of the network. Bin size may be based on access technologies and resource availability. In areas where there are fewer transmit points or access nodes available, the TCSP may elect to use larger bins than in more densely covered areas.

In various embodiments, a geographic traffic profile may be represented using a Poisson Point Process (PPP), in which traffic generated for each geographic bin is represented as a PPP having a specified mean intensity value. In one embodiment, a fixed mean intensity is specified for each bin. In another embodiment, the mean intensity for each bin is specified as having a Gaussian distribution with a specified mean and variance. In another embodiment, traffic is represented using a Matern cluster process with traffic generated according to a PPP inside each cluster. In another embodiment, traffic is represented as clustered traffic with a Gaussian-distributed mean traffic intensity inside each cluster, the traffic generated according to a PPP. Matern clustering is described for example in B. Blaszczyszyn and D. Yogeshwaran, "On comparison of clustering properties of point processes," Advances in Applied Probability, vol. 46, no. 1, pp. 1-20, 2014. The geographic traffic profile may indicate, for each geographic bin, an arrival rate of traffic demands, possibly along with demand levels and session times for those demands, for that bin. Traffic statistics can vary between bins and/or over time.

The procedure further comprises determining 420 whether to accommodate the request to establish the virtual network based on the provided information. Provided information may include the converted geographic traffic profile, as well as other parameters such as outage and delay requirements. The determination may involve a computation as described below. In an alternative embodiment, a lookup operation which approximates the computation by mapping input parameters to pre-computed decision outputs may be used. However this alternative requires pre-computation and storage operations which may not be desirable in some cases.

In some embodiments, determining 420 whether to accommodate the request is based on a selectable admission strategy. The procedure may further include selecting 425 an admission strategy to be used in the determination 420. The selection may be performed prior to or during the determination. For example, an aggressive admission strategy and a conservative admission strategy may be available. The selection may be made based on an indication of reliability of the information upon which the admission decision is based. For example, the geographic traffic profile information provided by the VN customer may be an inaccurate estimation of the real traffic demand, and a conservative admission strategy may accordingly be selected. In some embodiments, the real traffic demands are measured online during VN operation and the statistics representative of the real traffic demands are obtained by the admission controller and used in selecting the admission strategy. The customer may also be notified of updates to their expected traffic profile based on the real traffic demands.

It is noted that admission control is performed based on statistics while the network operates opportunistically to make use of remaining capacity for other services. For example, after establishing 440 a VN, scheduling can be performed opportunistically as part of VN operation 450. This means that better QoE can be achieved than the statistics for which the admission control decision was based on. Therefore, the aggressive admission strategy may be selected, which may result in admitting a VN which may have been rejected under a conservative admission strategy. Alternatively, depending on the nature of other VNs which may be adversely affected, and/or penalties specified in service level agreements already in place, a more conservative admission strategy may be implemented, in which a VN is admitted only if the VN can be accommodated with an acceptable margin of error. This may correspond to the feasibility constraints described below being satisfied by an acceptably wide margin.

The procedure further comprises establishing 440 the virtual network upon determining 420 to accommodate the request. Establishing the VN may include embedding the VN into the communication system, allocating and/or reserving network resources for supporting the VN, and configuring the resources to accommodate the VN. Establishing the VN can be initiated by transmitting instructions from the AC to one or more network nodes, such as network infrastructure nodes and InP interface devices. Establishing the VN can include creating a new virtual network or adjusting an existing virtual network. Establishing the VN can include instantiating or adjusting a network slice for hosting the VN. Further, an admission request can include a request for the creation of a new network slice.

Network slicing refers to a technique for separating different types of network traffic which can be used in reconfigurable network architectures, such as networks employing network function virtualization (NFV). A network slice (as defined in 3GPP TR 22.891 entitled "Study on New Services and Markets Technology Enablers," Release 14, Version 1.2.0, Jan. 20, 2016, is composed of a collection of logical network functions that supports the communication service requirements of particular use cases. Through the use of network slicing, service providers can have multiple distinct networks that run on the same physical set of network and computing resources. This can be used to create a virtual network dedicated to particular types of network traffic. Network slicing can also be applied to the radio access edge of the Radio Access Network (RAN) in order to create multiple distinct radio access networks or virtual networks including a radio access portion. In order to provide performance guarantees, network slices can be isolated from each other so that one slice does not negatively affect the other slices. The isolation is not restricted to different types of services, but also allows the operator to deploy multiple instances of the same network partition.

Network slicing allows the instantiation of separate network slices directed toward different virtual networks or sets of virtual networks. This allows for separation of different types of traffic, potentially having different packet processing requirements and QoS requirements. Network slicing may correspond to the allocation of pooled resources to offer different services to different customers or groups of customers, such that different services are supported by different customized virtual networks, where the different customized virtual networks are substantially separate from one another from the customer's point of view. The pooled resources may be commercial-off-the-shelf hardware components capable of configuration through virtualization approaches, such as NFV, in order to support various network functionalities for supporting the operations of the network slices.

According to embodiments of the present invention, the virtual network architecture is based on a network function virtualization (NFV) framework. The NFV framework can be used to define a plurality of virtual network functions (VNFs), each of which can correspond to a function enabling operation of a virtual network. For example a VNF can provide the functions of a router, switch, gateway, firewall, load balancer, server and the like. The function is virtualized in the sense that it may utilize a set of virtual resources, such as computing, storage and networking resources, rather than utilizing dedicated hardware resources. As such, VNFs may be instantiated on an as-needed basis using available virtual resources. NFV and virtual network functions architecture is described in ETSI GS NFV 001 entitled "network function virtualization (NFV); Use Cases", October 2013 and ETSI GS NFV 002 entitled "network function virtualization (NFV); Architectural Framework", October 2013, for example.

The procedure further comprises 450 operating the virtual network and monitoring operating parameters, such as the observed geographic distribution of real network traffic associated with the VN. Scheduling operations, such as opportunistic scheduling of resource usage, as well as power control operations and other operations such as inter-cell interference coordination, can also be performed as part of VN operation. Variable transmit power of mobile devices may be implemented, using power control operations to increase network performance and hence the number of admitted VNs. Interference control between access nodes may be implemented. Measurements of operating parameters may include network utilization, actual VN traffic, geographic distribution of actual VN traffic, and observed QoE parameters such as mean and variance thereof.

Prior estimates of parameters, such as customer-provided network traffic statistics, may be revised 460 based on actual observed network activity. The monitored operating parameters, such as statistics based on observed network traffic, can be provided for use in altering 465 the current admission control decision or performing future admission control decisions related to other VNs. The observed parameters may be used to determine amounts of network resources already allocated for use when considering a request to establish a new virtual network. This information may also be used in selecting 425 the admission strategy.

In some embodiments, the VN parameters may be renegotiated based on the measured demand, when measured demand differs sufficiently from the demand predictions included in the initial request. Information indicative of the monitored operating parameters can be provided 470 to the VN customer, for example for a fee. Accordingly, the VN customer may adjust its geographic traffic profile parameters and/or renegotiate costs based on the measured traffic details. In some embodiments, the observed traffic statistics may be transmitted to the VN customer. In some embodiments, a proposal for revised terms of service 475 can be transmitted to the VN customer based on the monitored operating parameters.

In an example embodiment, a VN customer may provide an initial geographic traffic profile expressed in terms of network traffic levels for a plurality of bins having a 100 m by 100 m size. After admission of the VN, traffic statistics can be obtained based on a larger set of 10 m by 10 m bins. The traffic statistics can be fed back to the customer, potentially along with an adjusted offer including proposed VN service parameters and/or pricing. The traffic statistics can also be fed back for use in future admission control decisions. Measured traffic statistics fed back to customers (for a fee) may be used to correct the customer's initial traffic estimates. The customer may then revise their requirements based on the traffic statistics and adjust the VN request accordingly. This allows VNOs to avoid the need to implement their own traffic measurement facilities.

In more detail, monitoring may be performed on the network by measuring VN traffic and network utilization. Network resource utilization information can be fed back for use in further admission control. For example, if network utilization is below a threshold, then aggressive admission can be done in future and if utilization is above the threshold or another threshold, then conservative admission can be used in future. For example, if less than $U_k$% of the resources in a given access node $b_k$ are used during network operation, then the effective bandwidth for this access node that is considered available for use when performing admission control for a future VN can be taken to be $W_k/U_k$, where $W_k$ is the nominal available bandwidth for access node $b_k$.

Further, monitoring may be performed in order to measure traffic demands for current VNs. Monitoring may be performed in order to ensure that VN customers are adhering to their contracts or agreements. For instance, the mean and the standard deviation of the traffic for each VN at each geographic bin can be calculated and compared with service parameters established for the VN.

In various embodiments, when it is determined that the request cannot be feasibly accommodated, the procedure includes 480 generating and transmitting revised terms of service to the VN customer. The revised terms of service may include parameters of a VN which can be feasibly accommodated and/or revised pricing information for accommodating the original or revised VN. Generating the revised terms of service may include generating revised QoS and/or QoE parameters for proposal to the VN customer, or alternatively for implementation without contacting the VN customer. Generating the revised terms of service may include obtaining from one or more external InPs an indication of further network resources which can be deployed to assist in accommodating the VN and determining additional costs for deploying the further network resources. The revised terms of service can be based on the additional cost information. Alternatively, the additional network resources may be obtained and the network deployed using the additional network resources, potentially without contacting the VN customer. Additional resources may be obtained from external InPs or deployed, for example in the form of new access points. In some embodiments, the QoE parameters of other VNs may be renegotiated to liberate network resources for use in accommodating the current request.

In some embodiments, when it is determined that the request cannot be feasibly accommodated, the procedure includes 485 revising the capacity to accommodate the VN and/or revising the requirements of the VN, for example by negotiating revised terms of service with the VN customer as described above. Following such a revision, the determination 420 can be performed again. Revising capacity to accommodate the VN may include deploying new capacity, obtaining additional network resources from InPs, and/or renegotiating terms of service for other VNs in order to free resources for accommodating the current VN.

Figure 5:
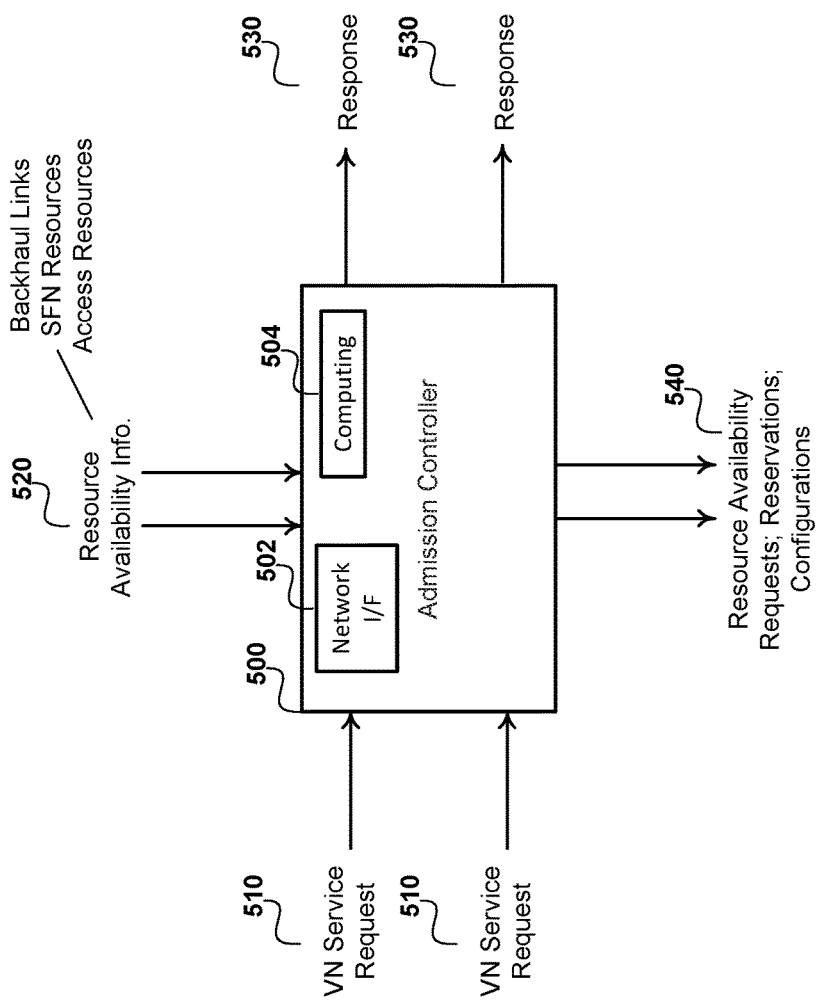
FIG. 5 illustrates an admission controller provided in accordance with an embodiment of the present invention.

FIG. 5 illustrates an admission controller 500 provided in accordance with an embodiment of the present invention. The admission controller includes a network interface 502 for transmitting and receiving messages from other entities such as customer devices and infrastructure provider devices. The admission controller further includes computing equipment 504 such as a microprocessor coupled to a memory holding program instructions for execution, or other electronic hardware configured for performing computing or lookup operations as described herein. The admission controller is configured to receive VN service requests 510 from VN operators via the network interface. The requests may include at least variability of demand based on area, and/or QoS/QoE/PKI parameters. The admission controller is further configured to receive, via the network interface, resource availability information 520 from one or more InPs. The resource availability information may include backhaul link abstraction information, SFN resource abstraction information, and access resource abstraction information. The resource information may include cloud resource availability, such as computer processor or memory resource availability accessible by intermediate nodes in the backhaul network for operating a service function requested in the VN. In various embodiments, abstraction information is provided as a substitute for complete detailed information. The abstraction information contains portions of more detailed information which are relevant to the current operation, but excludes at least some other portions. For example, rather than communicating link type and link medium, the link abstraction information may include only the amount of available capacity for one or more links.

The admission controller is configured to make an admission decision based on the received VN service requests 510 and resource availability information 520. The admission controller is further configured to communicate responses 530 to the VN customer's service requests based on the admission decision. Responses 530 can include an indication of the admission decision or a counter-offer of revised VN network parameters or terms of service that can be accommodated. The counter-offer may include cost options and operating parameter adjustment options for consideration.

The admission controller may be further configured to communicate 540 with InPs and network infrastructure equipment, for example in order to establish a VN, reserve network resources, and/or obtain network resource availability and pricing information for use in making admission decisions and/or counter-offers.

Figure 6:
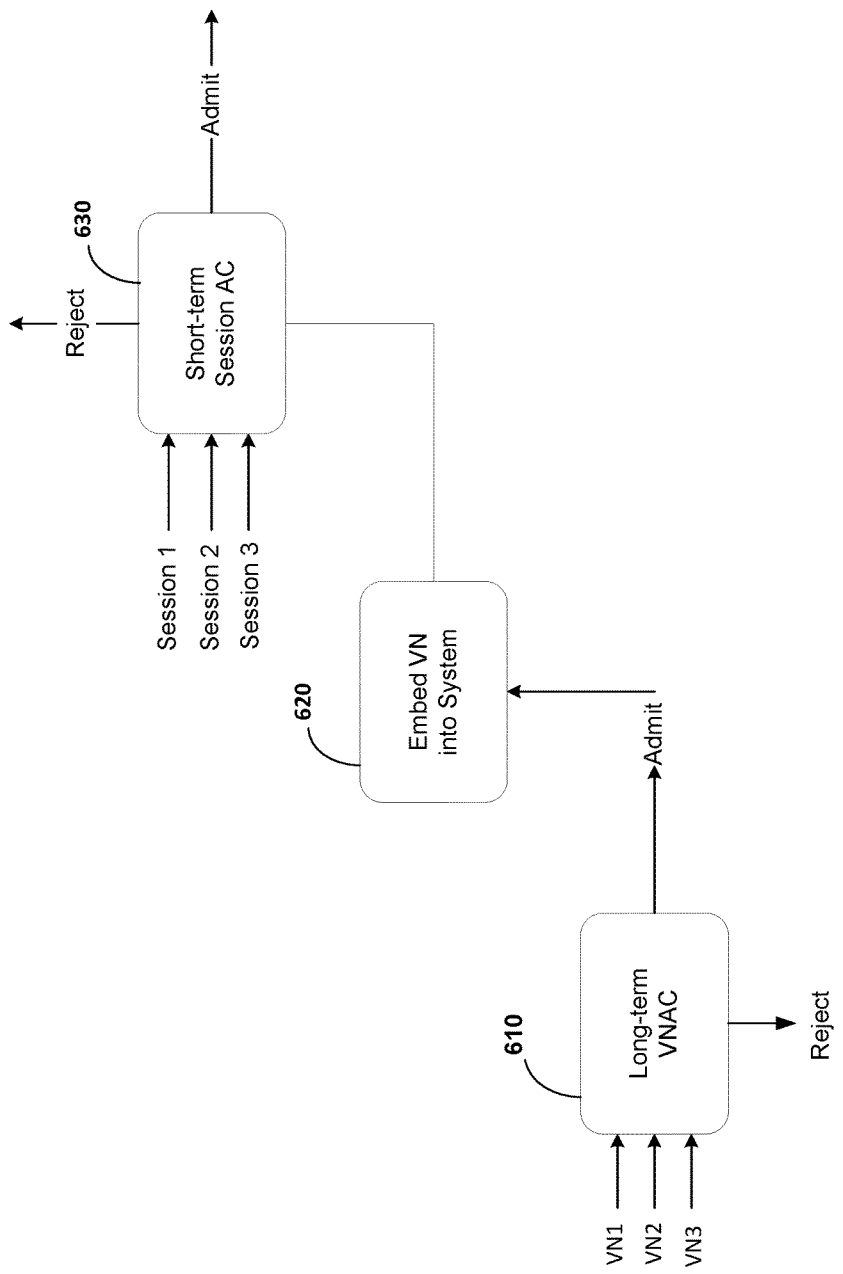
FIG. 6 illustrates virtual network admission control, according to an embodiment of the present invention.

In some embodiments, admission control is performed on a plurality of time scales, such as a long-term time scale and a short-term time scale. In the long term, VNs are admitted statistically based on resource availabilities. The statistical admission accounts for VNO-provided statistics indicative of customer device locations (such as mobile devices) and traffic demand distribution in space and optionally also in time. In the short term, single sessions of the admitted VN are admitted based on VNO contracts. For example, a session may be admitted only if it follows the restrictions and limitations of the VN admission contract. FIG. 6 illustrates operation in accordance with one embodiment of the present invention. VN admission control (VNAC) is performed 610 on a longer-term time scale.

Admitted VNs are embedded 620 into the communication system. Admission control for session requests of the admitted VNs is performed 630 on a shorter time scale.

Admission Control Computation

According to embodiments of the present invention, performing the admission control decision corresponds to solving or approximately solving a constrained optimization problem or a feasibility problem. The feasibility problem, also called a satisfiability problem, corresponds to a constrained optimization problem without regard to an objective function. In some embodiments, the problem is solved online via computation. Online computation may be performed by a suitably efficient and fast optimization procedure, which avoids or mitigates the need for pre-computation of solutions and/or table lookup operations.

In other embodiments, the problem is solved by performing a table lookup operation based on the operating parameters of the proposed VN request and parameters indicating the current resource availability. The lookup table includes sets of parameters and corresponding admission control decisions and can be populated for example by pre-computation of the feasibility or optimization problem over a range of different parameters.

Embodiments of the present invention solve an optimization or feasibility problem having a set of convex constraints such as the six convex constraints presented below, optionally along with the seventh presented constraint (C7). The use of convex constraints facilitates relatively efficient and fast computation potentially suitable for online computation, for example using convex optimization algorithms known in the art. Implementation of routines for solving the problems outlined below in mathematical notation, for example using a computer, would be readily understood by a worker skilled in the art.

Table 1 lists symbols which are used in the mathematical treatment below, along with their interpretation. The term "AN" refers to access node, "SINK" refers to signal-to-interference plus noise ratio, and "SE" refers to spectral efficiency.

TABLE 1

| Symbol | Definition |
| --- | --- |
| L | The network region |
| B | The set of ANs |
| b | A typical AN |
| l | A typical location |
| d | Traffic demand matrix |
| λ | Traffic demand mean matrix |
| t | Time index |
| A | The set of geographic bins |

TABLE 1-continued

| Symbol | Definition |
|---|---|
| a | A typical geographic bin |
| k | The AN index |
| K | The AN index set |
| j | The bin index |
| J | The bin index set |
| i | The VN index |
| I | The VN index set |
| V | The set of VNs |
| P | The received power matrix |
| $P_N$ | The noise power |
| γ | The SINR matrix |
| η | The SE matrix |
| U | AN maximum utilization array |
| O | The outage requirement array |
| C | The coverage requirement array |
| D | The delay requirement array |
| H | The AN backhaul capacity array |
| W | The AN available bandwidth array |
| x | The rate association matrix |
| M | The AN loads array |
| r | The total received rate matrix |
| Δ | The average of experienced delay matrix |
| Θ | The experienced delay matrix |
| ξ | The experienced coverage matrix |
| χ | The network cost |

The problem formulation and solution presented below focuses on the presence of downlink traffic, but uplink traffic can similarly be accommodated. The treatment below corresponds to an example embodiment of the present invention, for example for a software-defined radio access network with general backhaul and access components.

A geographic region L is considered as a two dimensional plane that is served by a set of ANs B. Each AN is characterized by its backhaul capacity $H_k$, for k belonging to K={1, . . . |B|} and its available bandwidth $W_k$ as illustrated in FIG. 3.

Let l denote a location from a set L of possible locations. Demand arrivals for a VN $v_i$ belonging to a set V at location l and at time t are denoted by $d_{il}^t$. The demand arrivals are random variables that follow arbitrary distributions with mean $\lambda_{il}^t$. V is the set of VNs, including VNs currently being served and the VN being subjected to admission control. This provides flexibility for inhomogeneous, i.e., heterogeneous or non-uniform, traffic characterization. To avoid notation complexity, the explicit time-dependence of variables is suppressed. In some embodiments, the present results are extended to span time-varying traffic statistics by profiling traffic for specific times of day, week, or year. To avoid unnecessary technical difficulties, the region L is assumed to correspond to a set of small (e.g., 5 m 5 m) bins (areas) a in a set A. With J={1, . . . |A|} and I={1, . . . |V|}, the demand for each bin is defined as:

$$d_{ij} = \int_{l \in a_j} d_{il}, j \in J, i \in I \quad (1)$$

It is assumed for clarity in the present embodiment that the ANs transmit with constant (not necessarily equal) power. With $P_{jk}$ representing the received power from AN $b_k$; k in K at bin $a_j$, and PN representing the noise power, the signal to interference plus noise ratio (SINR) for the center of bin $a_j$ in A if it is connected to AN $b_k$ in B is defined as:

$$\gamma_{jk} = \frac{P_{jk}}{P_N + \sum_{j' \in J \setminus j} P_{j'k}} \quad (2)$$

Received power can be calculated based on path-loss exponent and channel models as well as other environmental parameters. In practical cases, received power can be determined from field measurements. Spectral Efficiency (SE) can be a substantially arbitrary function of SINR. In some embodiments, SE follows Shannon's formula as follows:

$$\eta_{jk} = \log_2(1+\gamma_{jk}). \quad (3)$$

In the present embodiment, QoE is specified for $v_i$ in V by three main parameters: the required traffic demand which is specified by the traffic demand matrix d, the required maximum outage $O_i$ or the required minimum coverage probability $C_i$, and the required maximum delay $D_i$. VN requests may arrive with specific geographic traffic profiles and QoE requirements. Upon arrival of VN requests, the admission control problem is solved to determine whether to admit the VN. In various embodiments, the VN is admitted if all of its QoE requirements are satisfied and already existing VNs' services are expected to be unaffected.

The admission control operation, as a feasibility problem, determines whether there exists a set of values for a set of decision variables that satisfy a specified set of constraint equations. The decision variables are denoted by subscripted variables x, r and λ. Let $x_{ijk}$ denote the amount of rate received from AN $b_k$ in B at bin $a_j$ in A by VN $v_i$ in V. The objective of the optimization is to find a solution x* that satisfies optimization constraints. The first constraint requires that the sum of resources allocated by each AN to all bins cannot exceed its available resources:

$$C1: M_k = \sum_{i \in I} \sum_{j \in J} \frac{x_{ijk}}{\eta_{jk}} \leq W_k, \forall k \in K \quad (4)$$

Figure 7:
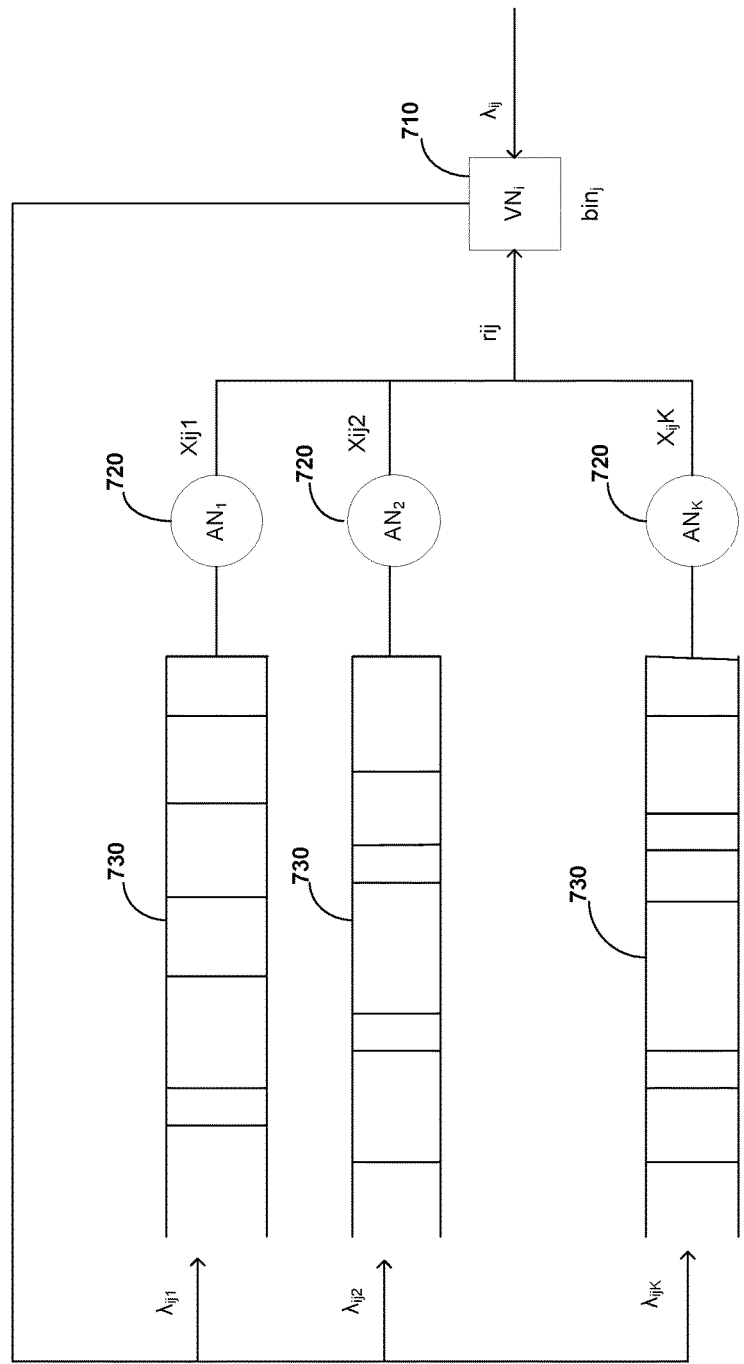
FIG. 7 illustrates a model of the downlink queues in access nodes, according to an embodiment of the present invention.

Assuming that session inter-arrival time in the time domain is exponentially distributed and is independent at all bins for all VNs, and the session sizes are distributed independently and exponentially, the downlink queues in ANs can be modeled by parallel M/M/1 queues. FIG. 7 illustrates a model of the downlink queues in ANs. Every bin 710 is served by multiple ANs 720 with downlink queues which have different arrival rates and service rates which can be modeled by separate parallel M/M/1 queues 730.

The total arrival rate for VN $v_i$ in V at bin $a_j$ in A is taken to be $\lambda_{ij}$. Assume that the arrived session requests are sent to AN $b_k$ in B with probability $p_{ijk}$. Then, the effective arrival rate for this AN is $\lambda_{ijk} = p_{ijk} \lambda_{ij}$ where:

$$\sum_{k \in K} p_{ijk} = 1, \forall i \in I, \forall j \in J. \quad (5)$$

Therefore, the second constraint is as follows:

$$C2: \sum_{k \in K} \lambda_{ijk} = \lambda_{ij}, \forall i \in I, \forall j \in J \quad (6)$$

Based on Burke's theorem on parallel queues, the average service delay for each bin $a_j$ in A for each VN $v_i$ in V from AN $b_k$ in B is defined as:

$$\Delta_{ijk} = \frac{1}{x_{ijk} - \lambda_{ijk}}. \quad (7)$$

The third constraint is that each VN at each bin cannot experience delay higher than its required maximum delay. In some embodiments, a delay requirement is defined only for time sensitive services. The maximum experienced delay by each VN at each bin is set equal to the maximum experienced delay in all parallel queues. Therefore, $$\max_{k \in K} \Delta_{ijk} \leq D_i, \forall i \in I, \forall j \in J. \tag{8}$$

In some embodiments, delay requirements can also be defined by customers for every geographic bin individually, or at least for selected geographic bins. In that case a delay requirement matrix $D_{ij}$ may be used in place of the delay requirement array $D_i$.

In Equation (8), the maximum delay for all parallel queues is required to be less than or equal to the delay threshold. This means that all delays for all parallel queues are required to be less than or equal to delay threshold, thus yielding the third constraint:

$$C3: \Delta_{ijk} \leq D_i, \forall i \in I, \forall j \in J, \forall k \in K. \tag{9}$$

In the present embodiment, the total delay experienced by a customer device is set equal to the sum of all delays from the moment that the service request is submitted to the wireless communication system until the moment when the customer device receives the service. For instance, backhaul transmission might add considerable delay in service. Processing delay (in AN as well as in customer devices) and propagation delay can also contribute to the total delay. In some embodiments, only the queuing and wireless service delays are considered in the downlink, and other delays are assumed to sum to zero for the purposes of admission control.

For all the queues in the ANs to be stable, it is also desired that all arrival rates in all queues be less than service rates, thus yielding the fourth constraint, which is an access node queue stability (overflow inhibition) constraint:

$$C4: \lambda_{ijk} \leq x_{ijk}, \forall i \in I, \forall j \in J, \forall k \in K. \tag{10}$$

Also note that in Equation (9) the maximum of the average experienced delays $\Delta_{ijk}$ is limited to be less than tolerance threshold $D_i$. Alternatively, this can be extended to another percentile of delays. For example, the experienced delays $\Delta_{ijk}$ may be restricted to be less than a threshold $D_i$ with a probability of q:

$$Pr\{\Theta_{ijk} \leq D_i\} \geq q, \forall i \in I, \forall j \in J, \forall k \in K. \tag{11}$$

This means that the cumulative distribution function (CDF) of delays is set to be greater than q at $D_i$:

$$CDF_{\Theta_{ijk}}(D_i) \geq q, \forall i \in I, \forall j \in J, \forall k \in K. \tag{12}$$

From M/M/1 queue analysis, it is known that the delay can be modeled having exponential distribution with parameter $x_{ijk} - k_{ijk}$. Therefore, Equation (12) can be written as $$1 = \exp(-D_i(x_{ijk} - \lambda_{ijk})) \geq q, \forall i \in I, \forall j \in J, \forall k \in K. \tag{13}$$

which can be in turn simplified to $$x_{ijk} - \lambda_{ijk} \geq \frac{-\log(1-q)}{D_i}, \forall i \in I, \forall j \in J, \forall k \in K. \tag{14}$$

Another constraint holds that the coverage probability for all customers is higher than a minimum required coverage value. The coverage probability for a VN $v_i$ in V for one bin $a_j$ in A is equal to the probability that the demand for this VN in this bin is less than its received rate from all ANs:

$$\xi_{ij} = Pr\{d_{ij} \leq r_{ij}\} \tag{15}$$

where $r_{ij}$ is the total rate received by VN $v_i$ in V at bin $a_j$ in A:

$$C5: r_{ij} = \sum_{k \in K} x_{ijk}, \forall i \in I, \forall j \in J. \tag{16}$$

To calculate the coverage probability for a VN over the entire network, one approach is to take an unweighted average, such as an unweighted mean. However, since different bins have different traffic demands, a weighted average can be taken in some embodiments:

$$\xi_i = \frac{1}{\lambda_i} \left( \sum_{j \in J} \lambda_{ij} \cdot \xi_{ij} \right) \tag{17}$$

where $\lambda_i = \sum_{j \in J} \lambda_{ij}$ is the total demand for VN $v_i$ in V. Therefore, the next constraint is a coverage probability constraint:

$$C6: \xi_i \geq C_i, \forall i \in I. \tag{18}$$

The constraint C6 specifies a lower limit on the probability that a demanded data rate for each one of the set of virtual networks at each of the set of geographic bins is less than a corresponding data rate which can be handled by said one of the set of virtual networks. Equivalently, the constraint C6 can be expressed as an upper limit on the probability that the demanded data rate is greater than the corresponding data rate which can be handled. In some embodiments the virtual network admission control feasibility problem can be cast as the following problem:

$$\text{find}_{x,r,\lambda} x \text{ subject to: } C1 \text{ to } C6 \tag{19}$$

In Equation (19), the constraints C1 to C5 are convex with respect to x, λ, and r. The variable x may be a rate association matrix. Therefore, the embodiment admission control feasibility problem is convex if the constraint (C6) is convex. First, note that C6 is convex if $\xi_i$ is a concave function of r. Also note that $\xi_i$ is a result of summation over $\xi_{ij}$. So, $\xi_{ij}$ is concave if $\xi_{ij}$ is a concave function with respect to r. From (15) it is clear that $\lambda_{ij}$ is the CDF of $d_{ij}$ at $r_{ij}$. Therefore, (19) is a convex optimization problem if d has a concave CDF. It can be shown that exponential distribution and uniform distribution have such a concave CDF, and therefore the problem is deemed to be convex in at least these cases. It is also noted that the Poisson distribution can be approximated by Gaussian distribution with high accuracy for λ>1000/second.

In some embodiments, an optimization problem is solved instead of or in addition to a feasibility problem. This approach may be used to determine a "best" resource allocation which satisfies a set of constraints. In some embodiments, the feasibility problem expressed in Equation (19) is solved first, and the feasible solution is used as a starting solution subjected to further optimization. For example, a best or approximately best resource allocation may result in an approximately locally or globally lowest energy consumption, network cost, or combination thereof. The optimization problem may seek to minimize a cost function or maximize an objective function. It is noted that solving an optimization problem also solves the corresponding feasibility problem, i.e. the problem with the objective function removed.

For example, in one embodiment, the virtual network admission control problem can be cast as the following problem, which attempts to minimize the network cost while satisfying multiple constraints:

$$\text{minimize}_{x,r,\lambda,\chi} \text{ subject to: } C1 \text{ to } C6 \quad (20)$$

In various embodiments, the network cost is a convex function of variables x. In one embodiment, the network cost is an exponential function of access node load:

$$\chi = \sum_{k \in K} e^{M_k}. \quad (21)$$

This may result in a degree of load balancing among access nodes. In another embodiment, min-max load balancing is sought using the following objective network cost function:

$$\chi = \max_{k \in K} M_k. \quad (22)$$

Min-max load balancing tends to produce more similar values of $M_k$ for various values of k, thereby causing loads among different access nodes to become more equal.

In the formulation of admission control feasibility problem in (19), the backhaul capacities are not explicitly expressed in the constraints. This may result in situations where the access part of an AN has sufficient capacity to serve a high number of customer devices while the backhaul capacity is limited. For example, in future networks, femtocell ANs may be deployed by customers and operators may face deployment restrictions (or cost considerations) in laying backhaul fiber-optic cable in many areas. In such cases, it may not be realistic to presume that backhaul links have unlimited capacities.

As such, in some embodiments the admission control feasibility or optimization problem may further incorporate a constraint indicative of limits on network backhaul capacity, expressed as:

$$C7: \sum_{i \in I} \sum_{j \in J} x_{ijk} \leq H_k, \forall k \in K \quad (23)$$

For example, the optimization problem may be formulated as:

$$\text{minimize}_{x,r,\lambda} \text{ Cost subject to: } C1 \text{ to } C7 \quad (24)$$

Figure 8:
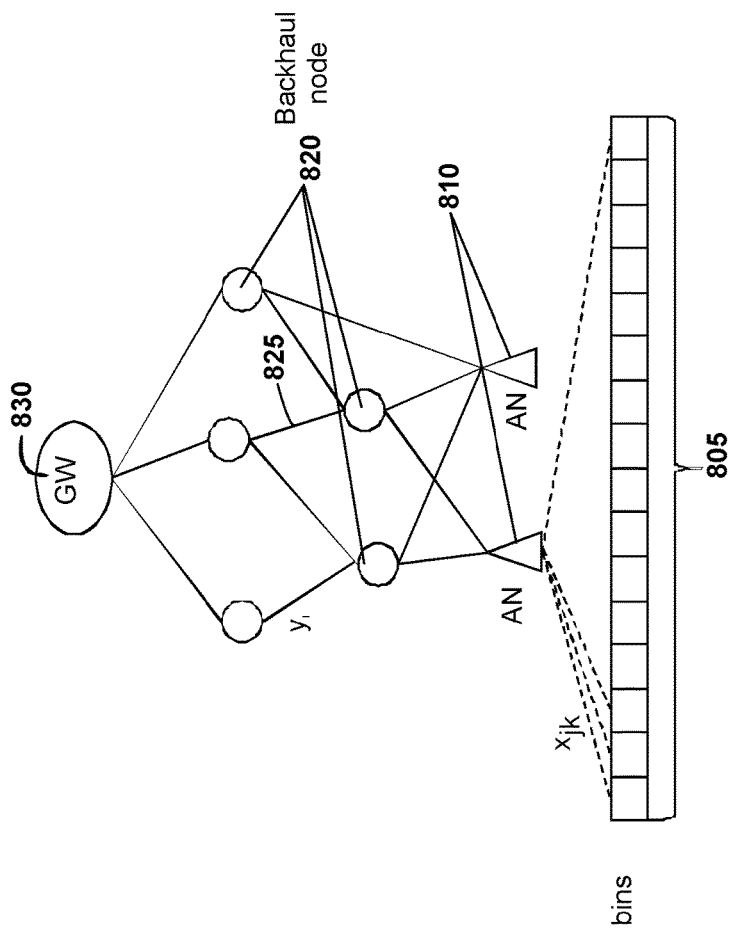
FIG. 8 shows an allocation to geographic bins for a network including backhaul nodes, according to an embodiment of the present invention.

FIG. 8 shows an allocation to bins 805 for a network including backhaul nodes according to an embodiment of the present invention. FIG. 8 illustrates a plurality of ANs 810 in communication with a GW 830 via a plurality of backhaul nodes 820 interconnected by backhaul links 825. As should be appreciated, in some situations these links and/nodes can have limited capacities. For a service or VN to be admitted, the sum of access traffic (i.e. traffic received from the access or edge portion of the network) should be less than the sum of backhaul link capacities to avoid congestion, blocking etc. A traffic engineering entity operating in the backhaul can ensure the following constraints are met:

$$\sum_{j \in J} x_{jk} = \sum_{l \in L_{out(k)}} y_l \quad \forall k \in K$$

$$\sum_{l \in L_{in(n)}} y_l = \sum_{l \in L_{out(n)}} y_l \quad \forall n \in N$$

$$y_l \leq C_l \quad \forall l \in L$$

For clarity, FIG. 8 only illustrates the allocation of traffic to bins for a single AN and a single VN. As illustrated, a general backhaul network may have potentially multiple backhaul links to each AN, each backhaul link having limited capacities. The sum of access traffic may be constrained to be less than the sum of backhaul link capacities, for example as enforced by the traffic engineering entity.

It will be readily understood that, throughout the preceding discussion, the above-described network functionalities and operations may correspond to a method for use in supporting operation of a communication network, such as but not limited to a 5th generation wireless communication network. The method may involve computer-implemented functions, namely functions which are implemented by one or more computing, communication and/or memory devices of the network infrastructure. Further, it will be readily understood that embodiments of the present invention relate to a communication network system or associated apparatus thereof, which is configured to perform the above-described network functionalities and operations. Again, the system or apparatus may comprise one or more computing, communication and/or memory devices of the network infrastructure.

Embodiments of the present invention may be implemented using specific servers or general-purpose computing, communication and/or memory devices. Computing devices used to implement method operations may include a processor operatively coupled to memory, the memory providing instructions for execution by the processor to perform the method as described herein. Embodiments of the present invention may be implemented at least in part using computing devices such as Application Specific Integrated Circuits, microcontrollers, and digital logic circuits. Embodiments of the present invention may be directed to improving internal operations of the communication network.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for admitting a virtual network, the method comprising:
   receiving a request to establish the virtual network, the request including a geographic traffic profile associated with the virtual network and expressed as a set of geographic bins corresponding to locations of all potential devices and associated traffic to be served by the virtual network;
   determining that accommodating the request is feasible based on both an indication of network resources available for use by the virtual network and at least one of: data rate, packet delay, outage probability, and a key performance indicator for the virtual network, the network resources including communication capacities available on backhaul links usable by the virtual network; and
   transmitting instructions to one or more network nodes to admit the virtual network.

2. The method of claim 1, wherein the geographic bins are further statistically indicative of amounts of virtual network traffic associated with said locations of all potential devices.

3. The method of claim 1, wherein determining that accommodating the request is feasible includes evaluating a set of constraints to determine that accommodating the request can be performed while respecting existing commitments to provide other communication services.

4. The method of claim 1, wherein determining that accommodating the request is feasible comprises solving a feasibility problem or an optimization problem accounting for a set of virtual networks including the virtual network along with other virtual networks currently being served.

5. A method for admitting a virtual network, the method comprising:
   receiving a request to establish the virtual network, the request including a geographic traffic profile associated with the virtual network;
   determining that accommodating the request is feasible based on an indication of network resources available for use by the virtual communication network, the network resources including communication capacities available on backhaul links usable by the virtual network; and
   transmitting instructions to one or more network nodes to admit the virtual communication network,
   wherein determining that accommodating the request is feasible comprises solving a feasibility problem or an optimization problem accounting for a set of virtual networks including the virtual network along with other virtual networks currently being served,
   wherein the feasibility problem or the optimization problem is characterized at least in part by constraints which encode some or all of: (C1) an upper limit on communication bandwidth allocated for use by access nodes serving the set of virtual networks; (C2) a requirement that, for each given location and virtual network belonging to the set of virtual networks, a statistical arrival rate of traffic which corresponds to said location and belongs to said virtual network equals a total, over all access nodes, of statistical arrival rates of traffic which is handled by said access nodes, corresponds to said location, and belongs to said virtual network; (C3) an upper limit on delays experienced for each flow of all the virtual networks; (C4) a stability requirement for queues held at access nodes serving the set of virtual networks; (C5) a conservation between data rates handled by each of the set of virtual networks and data rates handled by access nodes on behalf of each of the set of virtual networks; (C6) an upper limit on a probability that a demanded data rate for each one of the set of virtual networks at each of the set of geographic bins is greater than a corresponding data rate which can be handled by said one of the set of virtual networks; and (C7) an upper limit on data rates handled by access nodes on behalf of each of the set of virtual networks due to backhaul capacity limitations.

6. The method of claim 1, wherein determining that accommodating the request is feasible is based concurrently on considerations of data rate, packet delay and outage probability for the virtual network.

7. The method of claim 1, wherein the request is indicative of a time variation in the geographic traffic profile.

8. The method of claim 1, wherein the geographic traffic profile is indicative of one or more of: mobile device statistical distribution of spatial location; data rate requirements; connection outage requirements; data transmission delay requirements; and Quality of Experience (QoE) requirements.

9. The method of claim 1, wherein the request includes an indication of computing requirements for one or more service functions of the virtual network, storage requirements, or both, and wherein the network resources include computing resources for supporting the computing requirements, storage requirements, or both.

10. The method of claim 1, wherein the request is indicative of an offered compensation for establishing the virtual network, and wherein determining whether accommodating the request is feasible includes determining whether the offered compensation is acceptable.

11. The method of claim 1, further comprising, when accommodating the request is not feasible, transmitting an indication of an alternate virtual network configuration which can be accommodated using the network resources available for use by the virtual network.

12. The method of claim 1, wherein the network resources include wireless access link capacities available at access nodes usable by the virtual network.

13. The method of claim 1, further comprising, following admitting the virtual network, generating and transmitting a measurement of data traffic corresponding to usage of the virtual network, the measurement for use in revising the spatial profile of traffic requirements.

14. The method of claim 1, further comprising, following admitting the virtual network, generating a measurement of network resource usage due to operation of the virtual network, and adjusting an indication of network resources available for use by an additional virtual communication network based on the measurement, when determining whether accommodating a request for the additional virtual communication network is feasible.

15. The method of claim 1, wherein the network resources available for use include network resources of an external infrastructure provider, the method further comprising transmitting a message to the external infrastructure provider to allocate of network resources of the external infrastructure provider for use in the virtual network.

16. An admission controller in a communication network, comprising:
   a network interface configured to: receive a request for admitting a virtual network, the request including a geographic traffic profile associated with the virtual network and expressed as a set of geographic bins corresponding to locations of all potential devices and associated traffic to be served by the virtual network;

and transmit instructions to one or more network nodes to admit the virtual network when accommodating the request is feasible; and a computing device configured to determine whether accommodating the request is feasible based on both an indication of network resources available for use by the virtual network and at least one of: data rate, packet delay, outage probability, and a key performance indicator for the virtual network, the network resources including communication capacities available on backhaul links usable by the virtual network.

17. The admission controller of claim 16, wherein the geographic bins are further indicative of an amount of traffic associated with said locations of all potential devices.

18. The admission controller of claim 16, wherein determining that accommodating the request is feasible comprises solving a feasibility problem or an optimization problem accounting for a set of virtual networks including the virtual network along with other virtual networks currently being served.

19. The admission controller of claim 16, wherein the request includes an indication of computing requirements for one or more service functions of the virtual network, storage requirements, or both, and wherein the network resources include computing resources for supporting the computing requirements, storage requirements, or both.

20. The admission controller of claim 16, further configured, when accommodating the request is not feasible, to transmit, via the network interface, an indication of an alternate virtual network configuration which can be accommodated using the network resources available for use by the virtual network.

21. The admission controller of claim 16, further configured, following admitting the virtual network, to generate and transmit a measurement of data traffic corresponding to usage of the virtual network, the measurement for use in revising the spatial profile of traffic requirements.

22. The admission controller of claim 16, further configured, following admitting the virtual network, to generate a measurement of network resource usage due to operation of the virtual network, and adjust an indication of network resources available for use by an additional virtual communication network based on the measurement, when determining whether accommodating a request for the additional virtual communication network is feasible.

23. The admission controller of claim 16, wherein the network resources available for use include network resources of an external infrastructure provider, the admission controller further configured to transmit, via the network interface, a message to the external infrastructure provider to allocate of network resources of the external infrastructure provider for use in the virtual network.

24. The method of claim 1, wherein each of the geographic bins is associated with a respective area and respective statistics indicative of predicted traffic activity due to a plurality of devices in locations corresponding to said respective area.

25. The admission controller of claim 16, wherein each of the geographic bins is associated with a respective area and respective statistics indicative of predicted traffic activity due to a plurality of devices in locations corresponding to said respective area.

26. The method of claim 1, wherein the virtual network is hosted within a separate network slice provisioned using resources of a communication network, the resources including one or more of: physical network devices; portions of backhaul communication links; and virtual network functions, the resources of the communication network reserved exclusively for the network slice or shared between plural network slices including the network slice.

27. The admission controller of claim 16, wherein the virtual network is hosted within a separate network slice provisioned using resources of a communication network, the resources including one or more of: physical network devices; portions of backhaul communication links; and virtual network functions, the resources of the communication network reserved exclusively for the network slice or shared between plural network slices including the network slice.

28. The method of claim 1, wherein the request is further indicative of one or more of: key performance indicator requirements, service function chain requirements, average expected amount of traffic, expected traffic variability, expected peak traffic, traffic generation rate, allowable traffic outages, and allowable delays.

29. The admission controller of claim 16, wherein the request is further indicative of one or more of: key performance indicator requirements, service function chain requirements, average expected amount of traffic, expected traffic variability, expected peak traffic, traffic generation rate, allowable traffic outages, and allowable delays.

* * * * *